UNITED STATES PATENT OFFICE.

JAKOB SCHMID, OF BASLE, SWITZERLAND, ASSIGNOR TO THE SOCIETY OF CHEMICAL INDUSTRY IN BASLE, OF SAME PLACE.

BLUE-BLACK DISAZO DYE.

SPECIFICATION forming part of Letters Patent No. 557,440, dated March 31, 1896.

Application filed September 5, 1895. Serial No. 561,576. (Specimens.)

*To all whom it may concern:*

Be it known that I, JAKOB SCHMID, a citizen of Switzerland, residing at Basle, Switzerland, have invented new and useful Improvements in the Production of Blue-Black Disazo Coloring-Matters, of which the following is a specification.

My invention relates to the production of new asymmetrical disazo coloring-matters derived from naphthalenediamindisulfo-acid 1.8.3.6 one molecular proportion of paranitrodiazobenzene and one molecular proportion of another diazo compound. The process may be advantageously effected in this manner: that the naphthalenediamindisulfo-acid is first combined in a cooled aqueous solution with a diazo compound containing acetic acid or an alkali. The thus-formed mono-azo dyes having the property of being combined with a further equivalent of a diazo compound, are transformed into valuable blue-black asymmetrical disazo dyes by the action of paranitrodiazobenzene. The order in which the diazo compounds are combined with naphthalenediamindisulfo-acid may be varied in general without altering the result.

In carrying out my invention I proceed, for instance, as follows:

First Example: The diazo compound resulting from 9.3 kilos of anilin is mixed with thirty-two kilos of naphthalenediamindisulfo-acid 1.8.3.6 containing an excess of acetate of soda. Into the solution of the mono-azo dye which hereby results a solution of paranitrodiazobenzene, resulting from seven kilos of paranitroanalin in the usual way, is added. The brown solution turns into violet black, and after having been agitated during twelve hours the formation of the new disazo coloring-matter is terminated. It is isolated by addition of common salt, filtered, pressed, and dried. It dyes a deep black on wool. Analogous results are obtained if, instead of analin, the diazo derivatives of toluidin, nitrotoluidin, naphthylamin, or the sulfo or carboxylic acids of these bodies are used, or if the naphthalenediamindisulfo-acid is first combined with one equivalent of paranitrodiazobenzene, and if for the second combination the diazotized sulfo derivatives of analin, toluidin, and naphthylamin are used.

Second Example: 13.8 kilos of paranitroanilin are diazotized with seven kilos of sodium nitrite in the usual manner, and the resulting diazo solution is mixed with a solution of thirty-two kilos of naphthalenediamindisulfo-acid 1.8.3.6 containing sodium acetate in excess. After allowing to stand during several hours the red-violet solution of the mono-azo coloring-matter is mixed with paradiazobenzenesulfo-acid resulting from 19.5 kilos of soda salt of sulfanilic acid. The red-violet solution turns by and by into blue violet, and after agitating during twelve hours the combination is complete. The mass is heated to 80° centigrade, and the coloring-matter is precipitated with common salt, filtered, pressed, and dried.

The above-described new disazo coloring-matters, corresponding to the general formula:

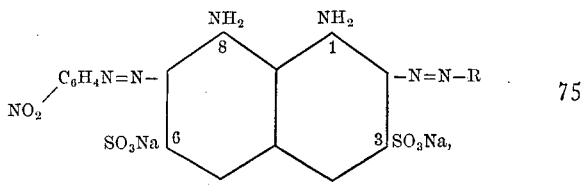

(where R represents the radicle of an anilin, toluidin, or naphthylamin derivative,) form black powders of a metallic luster, easily soluble in water with a dark-violet to dark-blue coloration, and produce on wool in an acid bath or on a mordant of a chrome salt deep blue-black to black tints of great fastness against light and in milling. They are insoluble in alcohol, ether, and benzene, soluble in concentrated sulfuric acid with a dark-green coloration, from which solution the free color-acid separates out by addition of water.

What I claim as new, and desire to secure by Letters Patent, is—

The new asymmetrical coloring-matters which can be obtained from one molecular proportion of naphthalenediamindisulfo-acid 1.8.3.6, one molecule of paranitrodiazobenzene and one molecule of another diazo body, such as paradiazobenzenesulfo-acid, forming black powders of a bronze luster, easily soluble in water with a dark-violet to dark-blue coloration, insoluble in alcohol, ether and benzene, soluble in concentrated sulfuric acid with a dark-green coloration from which solution the free color acid separates out by addition of water, and they produce on wool in an acid bath or on a mordant of a chrome salt, deep blue-black to black tints of great fastness against light and in milling.

In testimony whereof I have hereunto set my hand in the presence of two subscribing witnesses.

JAKOB SCHMID.

Witnesses:
GEORGE GIFFORD,
N. HENZI.